United States Patent [19]
Smith

[11] 4,285,425
[45] Aug. 25, 1981

[54] STEPPED BAFFLE STORAGE BIN

[76] Inventor: George L. Smith, P.O. Box 2153, Sanford, Fla. 32771

[21] Appl. No.: 66,492

[22] Filed: Aug. 13, 1979

[51] Int. Cl.³ .............................................. B65G 11/20
[52] U.S. Cl. ...................................... 193/27; 141/392; 193/32
[58] Field of Search ...................... 99/646 C; 141/392; 193/27, 32; 222/564

[56] References Cited
U.S. PATENT DOCUMENTS

| | | | |
|---|---|---|---|
| 243,403 | 6/1881 | Randol | 193/27 |
| 1,920,457 | 8/1933 | Barling | 193/32 |

Primary Examiner—Frederick R. Schmidt
Attorney, Agent, or Firm—Duckworth, Hobby, Allen, Dyer & Pettis

[57] ABSTRACT

A storage bin for plural articles, such as citrus fruit, comprises a housing having an opening at the upper extremity thereof for gravity feeding the articles into the housing. The bin includes a downwardly sloped baffle in the housing for breaking the fall of the article to prevent damage to the articles, the baffle formed of plural, parallel steps, each step being spaced from adjacent steps a distance which permits the articles to pass there between in order to fill the void underneath the baffle.

1 Claim, 1 Drawing Figure

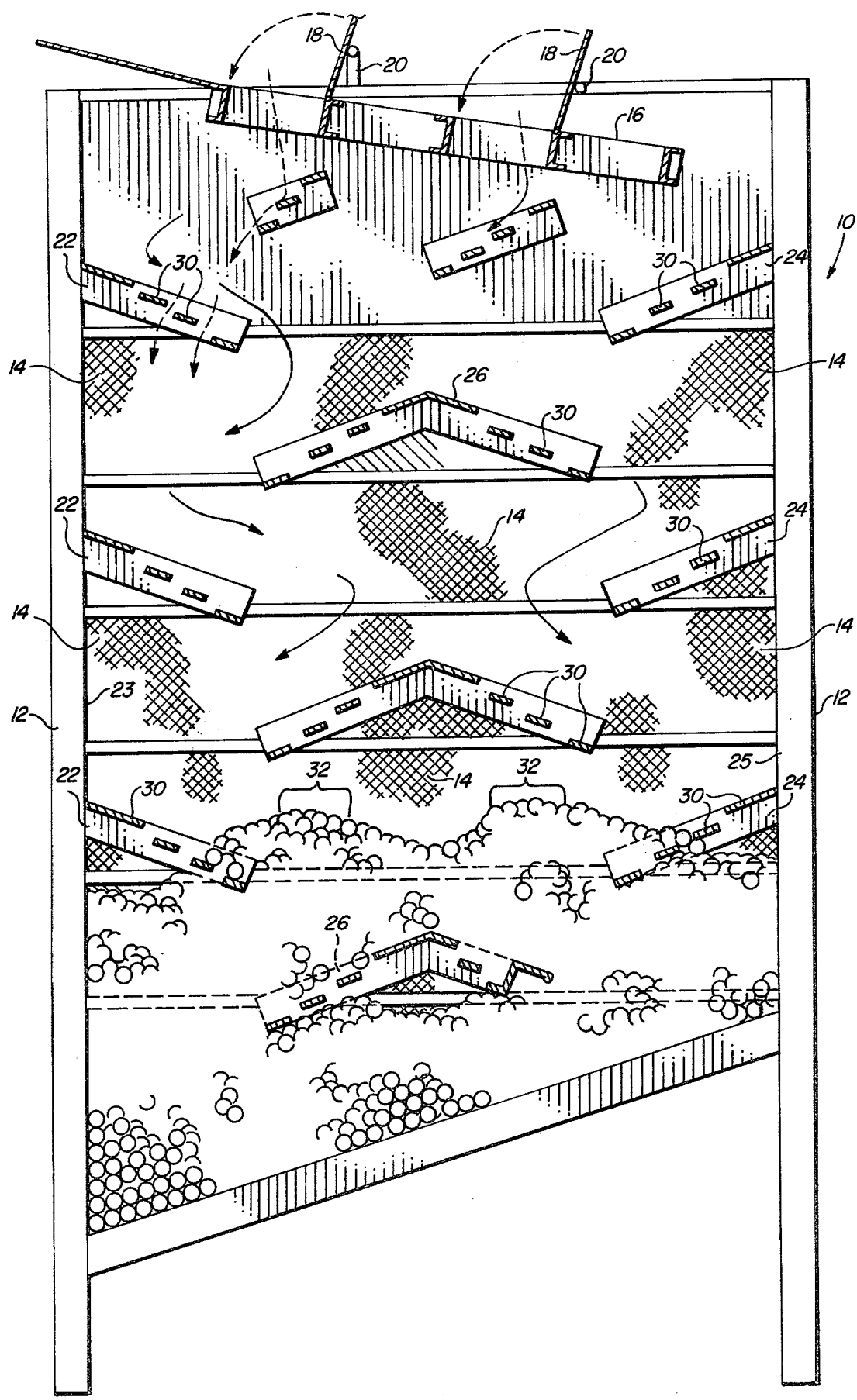

STEPPED BAFFLE STORAGE BIN

BACKGROUND OF THE INVENTION

1. Field of the Invention

The present invention relates to storage containers, and in particular, relates to storage bins for articles such as citrus fruit and the like which require the gradual feeding of the articles into the storage bin to avoid damage.

2. Description of the Prior Art

In the citrus industry, there is a requirement that large amounts of citrus fruit be stored for a relatively long period of time between harvesting and the use of the fruit in the juice concentrating process. Conditionally, the citrus industry has used large, open storage bins formed of an enclosure created by a wire mesh between corner posts, and with plural baffles extending from opposing sides of the bin to break the fall of the fruit as it is gravity fed into the bin. Typically, a large number of these storage bins will be used at a single use processing facility.

One of the difficulties associated with storage bins of the type described above is that the baffles, which are required to avoid damage to the fruit, create voids which substantially reduce the amount of storage volume available inside the storage container. When a large number of bins are employed, the loss in storage volume is significant.

SUMMARY OF THE INVENTION

The present invention contemplates a storage bin for plural articles, such as citrus fruit or the like, including a housing having an opening at the upper extremity thereof for gravity feeding the articles into the housing. The bin includes a downwardly sloped baffle in the housing for breaking the fall of the articles to prevent damage to the articles, and means for feeding the articles into the void underneath the baffle.

In accordance with a preferred embodiment of the present invention, the means for feeding the articles into the void underneath the baffle comprises the baffle formed of plural individual steps, each step being spaced from adjacent steps a distance which permits the articles to pass there between.

Further, in accordance with the preferred embodiment of the present invention, the baffle arrangement comprises first and second baffles in the housing, each sloping downwardly away from opposing sides thereof, the extremity of the baffles terminating short of the opposing side. As the fruit is stacked upwardly from the opposing baffle and wall, the fruit is caused to tumble downward back toward one of the baffles, and then through the space between adjacent steps of the baffle and into the void created by that baffle. In this way, the previously unused storage space formed by the void underneath that baffle is used to significantly increase the total storage volume within a conventional storage bin.

DESCRIPTION OF THE DRAWING

The single FIGURE of the drawing is a cross-sectional view illustrating a storage bin in accordance with the present invention.

DETAILED DESCRIPTION OF THE PREFERRED EMBODIMENT

A preferred embodiment of the present invention will now be described with reference to single FIGURE of the drawing.

Noting the drawing, the storage bin, referred to generally by the reference numeral 10, includes four (4) posts (two of which are shown in the drawing) which form the four corners of the storage container. A wire mesh 14, shown along the backside of the cross-section of the drawing, is conventionally fixed between adjacent post 12 to enclose the container. Preferably, the posts are formed of a rigid angle iron of sufficient strength to withstand lateral pressures of several thousand pounds.

At the upper extremity of the storage container 10, there is a sloped gate 16 along which the fruit or other article is fed into doors 18 associated with the gate. The doors 18 are held in the open position by pipe stops 20.

The storage container 10 further includes a first set of baffles 22 extending downwardly and preferably parallel one with the other, from a first side 23 formed between two posts 12. Container 10 further includes a second set of baffles 24 extending from a second side 25 approaching the first side 23, all of the baffles in the second set being substantially parallel. The first and second set of baffles extend into the storage area of the container 10 only a short distance which preferably is on the order of about three or four feet. As shown in the drawing, each baffle of one set 22, 24, is opposed by a baffle of the other set.

A third set of baffles 26 is positioned in the container 10, each baffle 26 of the third set being vertically distributed between opposing pairs of the first and second baffles 22, 24 (note the drawing). Preferably, each baffle of the third set includes two sloped portions, a first portion being sloped downwardly from the center line of the storage container 10 toward the first wall 23, and the second portion being sloped downwardly from the center line of the storage container 10 toward the second wall, opposing wall 25.

The structure of the storage container 10 described thus far is in accordance with conventional storage bins which have been used in the citrus industry to store juice or citrus fruit for relatively long periods of time.

In accordance with the present invention, each baffle 22, 24 and 26 is formed of plural, spaced and parallel steps 30 which extend between opposing end member 28, such as angle line for example. As is shown in the drawing, the space between adjacent steps 30 of each baffle 22, 24 and 26 is a dimension which permits the articles to be stored in container 10 to pass between adjacent steps; by way of example, citrus fruit is shown being stored in the bin 10 of the drawing. In order to illustrate the dimensions of the structure of the storage bin 10, a typical dimension between adjacent post 12 is on the order of ten feet, with the posts rising about twenty feet vertically, the baffles being spaced about four feet apart in a vertical direction, and being sloped downwardly from the horizontal at an angle of about 20°. Typically, the vertical space between adjacent steps 30 is on the order of about five and one-half inches. However, it will be understood by those skilled in the art that these dimensions will vary greatly dependent upon the application of the particular storage bin 10, and these dimensions are given by way of example only.

The manner in which the storage container 10 functions will now be described. Noting the bottom half of the drawing, the citrus fruit is gravity fed downward through the bin, and damage caused by falling through the bin is avoided by virtue of the baffles breaking the fall of the fruit as it falls through the container. As the fruit reaches a point where it has already filled, the fruit tends to form a small stack, such as the stacks referred to by the reference numeral 32. As this fruit stacks upwardly, and additional fruit is passed across the steps formed of the adjacent baffle 22 or 24, the fruit tends to roll backwards towards the baffle. Some of the fruit will pass through the space between adjacent steps 30, and thereafter into the void underneath the baffle 22 or 24. A similar action takes place with respect to the third set of baffles 26, because of the spaced relationship of the steps 30 which form those baffles. Further, as the fruit is bouncing and moving across the steps 30 which form each baffle 22, 24 and 26, some of that fruit passes through the space between adjacent steps and as the storage bin 10 is filled, the voids underneath the baffles are likewise filled in this manner, in addition to the backrolled manner of filling those voids as described above. In this way, a significant increase in the storage volume of the storage bin 10 is recognized with respect to the prior art.

What is claimed is:

1. A storage bin for citrus fruit and the like, comprising:

a housing having an opening at the upper extremity thereof for gravity feeding said articles into said housing;

a first set of baffles in said housing spaced away from one side thereof and each baffle of said first set sloping downwardly toward an opposing side;

a second set of baffles in said housing spaced along said opposing side, each baffle of said second set extending downwardly and terminating short of said one side;

a third set of baffles, each baffle of said third set sloping downwardly and extending across said housing and interposed between an adjacent pair of said first and second baffles below said adjacent baffle pair at a point permitting each third baffle to receive the flow of fruit or the like from the end of the adjacent first and second baffle pair;

each baffle of said first, second and third baffle set formed of plural, substantially parallel steps, each step being spaced from adjacent steps a distance which permits said citrus fruit to pass therebetween, so as to permit said fruit to occupy the volume underneath said baffles.

* * * * *